United States Patent
Huang et al.

(10) Patent No.: US 10,141,778 B2
(45) Date of Patent: Nov. 27, 2018

(54) REDUNDANT POWER AND POWER SAVING METHOD THEREOF IN COLD REDUNDANT MODE

(71) Applicant: 3Y Power Technology (Taiwan), Inc., Taoyuan (TW)

(72) Inventors: Chih-Hung Huang, Taoyuan (TW); Change-Yuan Liu, Taoyuan (TW)

(73) Assignee: 3Y Power Technology (Taiwan), Inc., Taoyuan (TW)

( * ) Notice: Subject to any disclaimer, the term of this patent is extended or adjusted under 35 U.S.C. 154(b) by 275 days.

(21) Appl. No.: 15/209,738

(22) Filed: Jul. 13, 2016

(65) Prior Publication Data

US 2017/0018958 A1 Jan. 19, 2017

(30) Foreign Application Priority Data

Jul. 14, 2015 (CN) .......................... 2015 1 0410446

(51) Int. Cl.
*H02J 9/00* (2006.01)
(52) U.S. Cl.
CPC ..................... *H02J 9/005* (2013.01)
(58) Field of Classification Search
CPC ........................................................ H02J 9/005
See application file for complete search history.

(56) References Cited

U.S. PATENT DOCUMENTS

| | | | | |
|---|---|---|---|---|
| 8,400,795 B2* | 3/2013 | Blackwell | ................. | H02J 1/10 363/65 |
| 2009/0295469 A1* | 12/2009 | DuBose | ................. | H02M 3/156 327/544 |
| 2011/0310647 A1* | 12/2011 | Humphrey | .......... | H02M 3/1584 363/126 |
| 2013/0043727 A1* | 2/2013 | Liu | ........................... | G06F 1/26 307/31 |
| 2015/0303688 A1* | 10/2015 | Tsai | ........................ | H02J 1/102 307/64 |

* cited by examiner

*Primary Examiner* — Jared Fureman
*Assistant Examiner* — Duc M Pham
(74) *Attorney, Agent, or Firm* — Chieh-Mei Wang

(57) ABSTRACT

A redundant power includes a main power circuit for generating main power, a main power isolation unit, an auxiliary power circuit for generating auxiliary power, an auxiliary power isolation unit and a micro control unit. The main power isolation unit and auxiliary power isolation unit receive and output the main power and auxiliary power respectively. The micro control unit transmits a cold redundant signal to the main power circuit and auxiliary power circuit when receiving the cold redundant signal and outputs first and second disable signals to the main power isolation unit and auxiliary power isolation unit respectively. In response to the cold redundant signal, the main power circuit and auxiliary power circuit reduce levels of the main power and auxiliary power respectively. The main power isolation unit and auxiliary power isolation unit are disabled according to the first and second disable signals respectively.

15 Claims, 5 Drawing Sheets

REDUNDANT POWER AND POWER SAVING METHOD THEREOF IN COLD REDUNDANT MODE

TECHNICAL FIELD

The present invention relates to the field of power technology, and more particularly to a redundant power and a power saving method of a redundant power in a cold redundant mode.

BACKGROUND

The conventional power supply device with power redundant mechanism may generate a main direct current (DC) power and a redundant DC power at the same time during the operation. Generally, both of the main DC power and the redundant DC power are provided to the external device when the main DC power is normal. On the contrary, the redundant DC power is provided to the external device when the main DC power is abnormal. Therefore, the power supply device can maintain the power supply function even if the main DC power has abnormalities.

However, when the conventional power supply device with power redundant mechanism is operated in a cold redundant (CR) mode, the input power consumption is about 10 W, which is relatively high.

SUMMARY

One objective of the present invention is to provide a redundant power capable of reducing power consumption while being operated under a cold redundant mode.

Another objective of the present invention is to provide a power saving method of a redundant power under a cold redundant mode capable of reducing power consumption.

The present invention provides a redundant power, which includes a main power circuit, a main power isolation unit, an auxiliary power circuit, an auxiliary power isolation unit and a micro control unit. The main power circuit is configured to generate a main power. The main power has a main power operation voltage level and a main power standby voltage level, and the main power operation voltage level is higher than the main power standby voltage level. The main power isolation unit is coupled to the main power circuit and configured to receive and output the main power. The auxiliary power circuit is configured to generate an auxiliary power. The auxiliary power has an auxiliary power operation voltage level and an auxiliary power standby voltage level, and the auxiliary power operation voltage level is higher than the auxiliary power standby voltage level. The auxiliary power isolation unit is coupled to the auxiliary power circuit and configured to receive and output the auxiliary power. The micro control unit is configured to transmit a cold redundant signal to the main power circuit and the auxiliary power circuit when receiving the cold redundant signal outputted from an external system. The micro control unit is further configured to output a first disable signal and a second disable signal to the main power isolation unit and the auxiliary power isolation unit respectively. The main power circuit reduces the main power from the main power operation voltage level to the main power standby voltage level and the auxiliary power circuit reduces the auxiliary power from the auxiliary power operation voltage level to the auxiliary power standby voltage level in response to the cold redundant signal. The main power isolation unit is disabled according to the first disable signal and the auxiliary power isolation unit is disabled according to the second disable signal.

In summary, when the redundant power of the present invention is operated in the cold redundant mode, the micro control unit transmits the cold redundant signal outputted from the external system to the main power circuit and the auxiliary power circuit. In response to the cold redundant signal, both of the main power circuit and the auxiliary power circuit reduce the respective output voltages for reducing the respective output powers. Compared with the prior art, the redundant power of the present invention has reduced power consumption, and the power consumption may decrease to less than 4 W.

In one embodiment, the main power circuit includes a voltage feedback control unit. The voltage feedback control unit is coupled to the micro control unit. The voltage feedback control unit is configured to obtain voltage level information of the main power, transmit the voltage level information to the micro control unit and receive the cold redundant signal outputted from the micro control unit.

In one embodiment, the auxiliary power circuit includes an auxiliary power isolation unit controller. The auxiliary power isolation unit controller is coupled to the micro control unit. The auxiliary power isolation unit controller is configured to receive the second disable signal outputted from the micro control unit and disable the auxiliary power isolation unit according to the second disable signal.

In one embodiment, the main power isolation unit further includes a first field effect transistor and the auxiliary power isolation unit includes a second field effect transistor. A source of the first field effect transistor is connected to an output terminal of the main power circuit; a gate of the first field effect transistor is connected to the micro control unit; and a drain of the first field effect transistor is defined as a first output terminal. A source of the second field effect transistor is connected to an output terminal of the auxiliary power circuit; a gate of the second field effect transistor is connected to the auxiliary power isolation unit controller; and a drain of the second field effect transistor is defined as a second output terminal.

In one embodiment, the micro control unit outputs the first disable signal to the main power isolation unit when an output current of the main power is 5 A and no voltage occurs between the gate and the source of the first field effect transistor.

In one embodiment, when a protection mechanism of the redundant power is activated, the micro control unit outputs the first disable signal to the main power isolation unit or outputs the second disable signal to the auxiliary power isolation unit for preventing a backflow current.

In one embodiment, the micro control unit is in communication with the external system via an Inter-Integrated Circuit ($I^2C$) bus.

The present invention further provides a power saving method of a redundant power in a cold redundant mode. The power saving method includes: providing a main power circuit and an auxiliary power circuit to generate a main power and an auxiliary power respectively, wherein the main power has a main power operation voltage level and a main power standby voltage level, and the main power operation voltage level is higher than the main power standby voltage level, wherein the auxiliary power has an auxiliary power operation voltage level and an auxiliary power standby voltage level, and the auxiliary power operation voltage level is higher than the auxiliary power standby voltage level; providing a micro control unit to detect whether an external system outputs a cold redundant signal; and when the micro control unit receives the cold redundant signal outputted by the external system, configuring the main power circuit to reduce the main power from the main power operation voltage level to the main power standby voltage level and configuring the auxiliary power circuit to reduce the auxiliary power from the auxiliary power operation voltage level to the auxiliary power standby voltage level in response to the cold redundant signal.

In one embodiment, the aforementioned power saving method of the redundant power in the cold redundant mode further includes: providing a main power isolation unit and an auxiliary power isolation unit to receive and output the main power and the auxiliary power respectively; when the micro control unit receives the cold redundant signal outputted by the external system, configuring the micro control unit to output a first disable signal and a second disable signal to the main power isolation unit and the auxiliary power isolation unit respectively, wherein the main power isolation unit is disabled according to the first disable signal and the auxiliary power isolation unit is disabled according to the second disable signal.

In one embodiment, the aforementioned power saving method of the redundant power in the cold redundant mode further includes: providing a voltage feedback control unit to obtain voltage level information of the main power, transmit the voltage level information to the micro control unit, and receive the cold redundant signal outputted from the micro control unit.

In one embodiment, the aforementioned power saving method of the redundant power in the cold redundant mode further includes: providing an auxiliary power isolation unit controller to receive the second disable signal outputted from the micro control unit and disable the auxiliary power isolation unit according to the second disable signal.

In one embodiment, the step of providing a main power isolation unit includes: providing a first field effect transistor. A source of the first field effect transistor is for receiving the main power; a gate of the first field effect transistor is for receiving the first disable signal; and a drain of the first field effect transistor is for outputting the main power. The step of providing an auxiliary power isolation unit includes: providing a second field effect transistor. A source of the second field effect transistor is for receiving the auxiliary power; a gate of the second field effect transistor is for receiving the second disable signal; and a drain of the second field effect transistor is for outputting the auxiliary power.

In one embodiment, the micro control unit outputs the first disable signal to the main power isolation unit when an output current of the main power is 5 A and no voltage occurs between the gate and the source of the first field effect transistor.

In one embodiment, the aforementioned power saving method of the redundant power in the cold redundant mode further includes: when a protection mechanism of the redundant power is activated, configuring the micro control unit to output the first disable signal to the main power isolation unit or output the second disable signal to the auxiliary power isolation unit for preventing a backflow current.

In one embodiment, the micro control unit is in communication with the external system via an Inter-Integrated Circuit ($I^2C$) bus.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
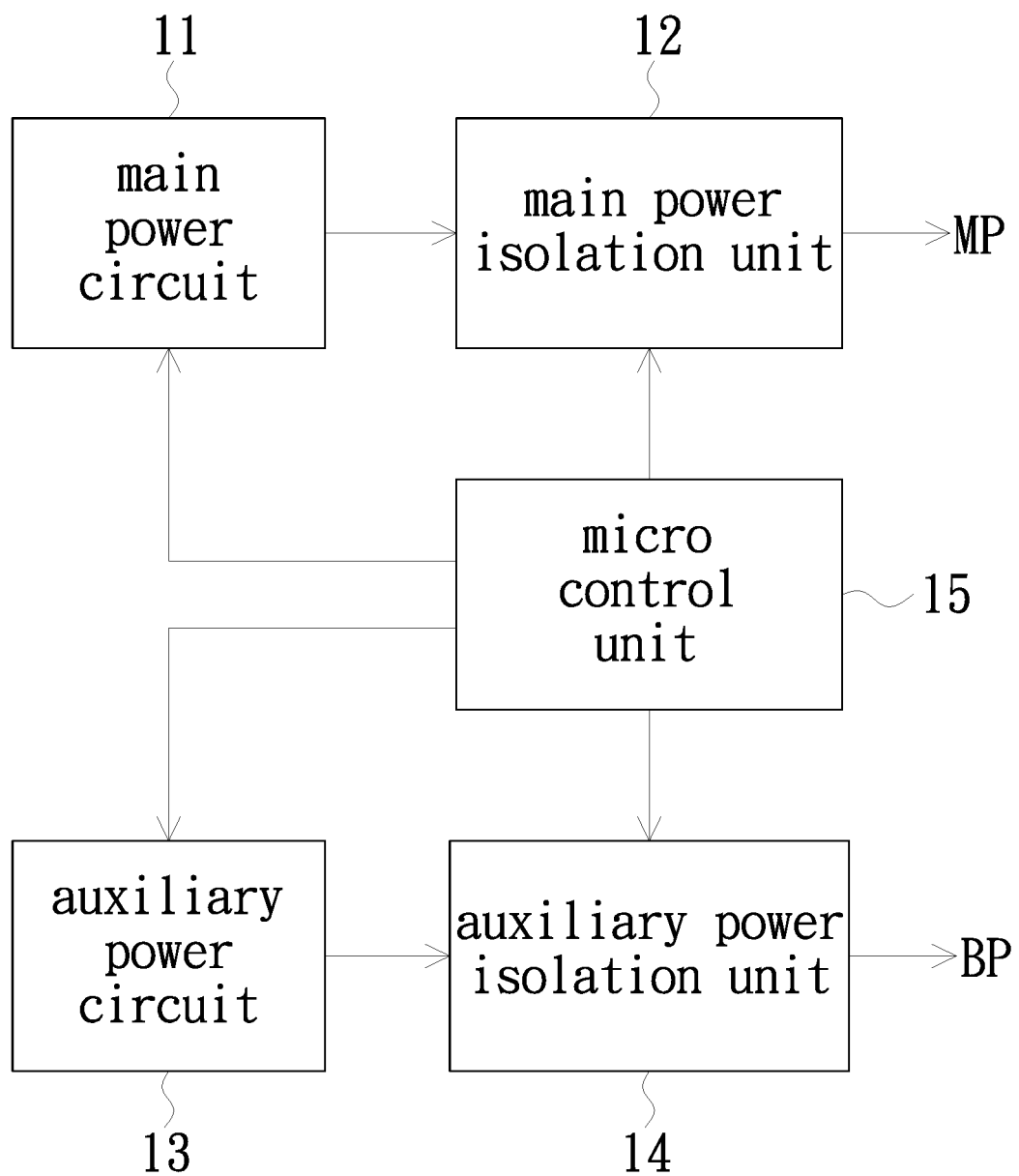
FIG. 1 is a block view of a redundant power in accordance with an embodiment of the present invention.

Please refer to FIG. 1, which is a block view of a redundant power in accordance with an embodiment of the present invention. As shown, the redundant power 100 of the present embodiment includes a main power circuit 11, a main power isolation unit 12, an auxiliary power circuit 13, an auxiliary power isolation unit 14 and a micro control unit 15. The main power circuit 11 is configured to generate a main power MP. The main power MP has a main power operation voltage level and a main power standby voltage level, and the main power operation voltage level is higher than the main power standby voltage level. The main power isolation unit 12 is coupled to the main power circuit 11 and configured to receive and output the main power MP. The auxiliary power circuit 13 is configured to generate an auxiliary power BP. The auxiliary power BP has an auxiliary power operation voltage level and an auxiliary power standby voltage level, and the auxiliary power operation voltage level is higher than the auxiliary power standby voltage level. The auxiliary power isolation unit 14 is coupled to the auxiliary power circuit 13 and configured to receive and output the auxiliary power BP. The micro control unit 15 is configured to transmit a cold redundant (CR) signal to the main power circuit 11 and the auxiliary power circuit 13 when receiving the cold redundant signal outputted from an external system (not shown). The micro control unit 15 outputs a first disable signal and a second disable signal to the main power isolation unit 12 and the auxiliary power isolation unit 14 respectively. The main power circuit 11 decreases the main power MP from the main power operation voltage level to the main power standby voltage level according to the cold redundant signal. At the same time, the auxiliary power circuit 13 also decreases the auxiliary power BP from the auxiliary power operation voltage level to the auxiliary power standby voltage level according to the cold redundant signal. The main power isolation unit 12 is disabled according to the first disable signal and the auxiliary power isolation unit 14 is disabled according to the second disable signal.

In the present embodiment, the main power voltage level, the auxiliary power voltage level, the main power standby voltage level and the auxiliary power standby voltage level are direct current (DC) power. Specifically, the main power voltage level is 12V; the auxiliary power voltage level is 12V or 5V; the main power standby voltage level is 11.8~11.4V; and the auxiliary power standby voltage level is 11.8~11.4V or 4.8~4.75V.

Figure 2:
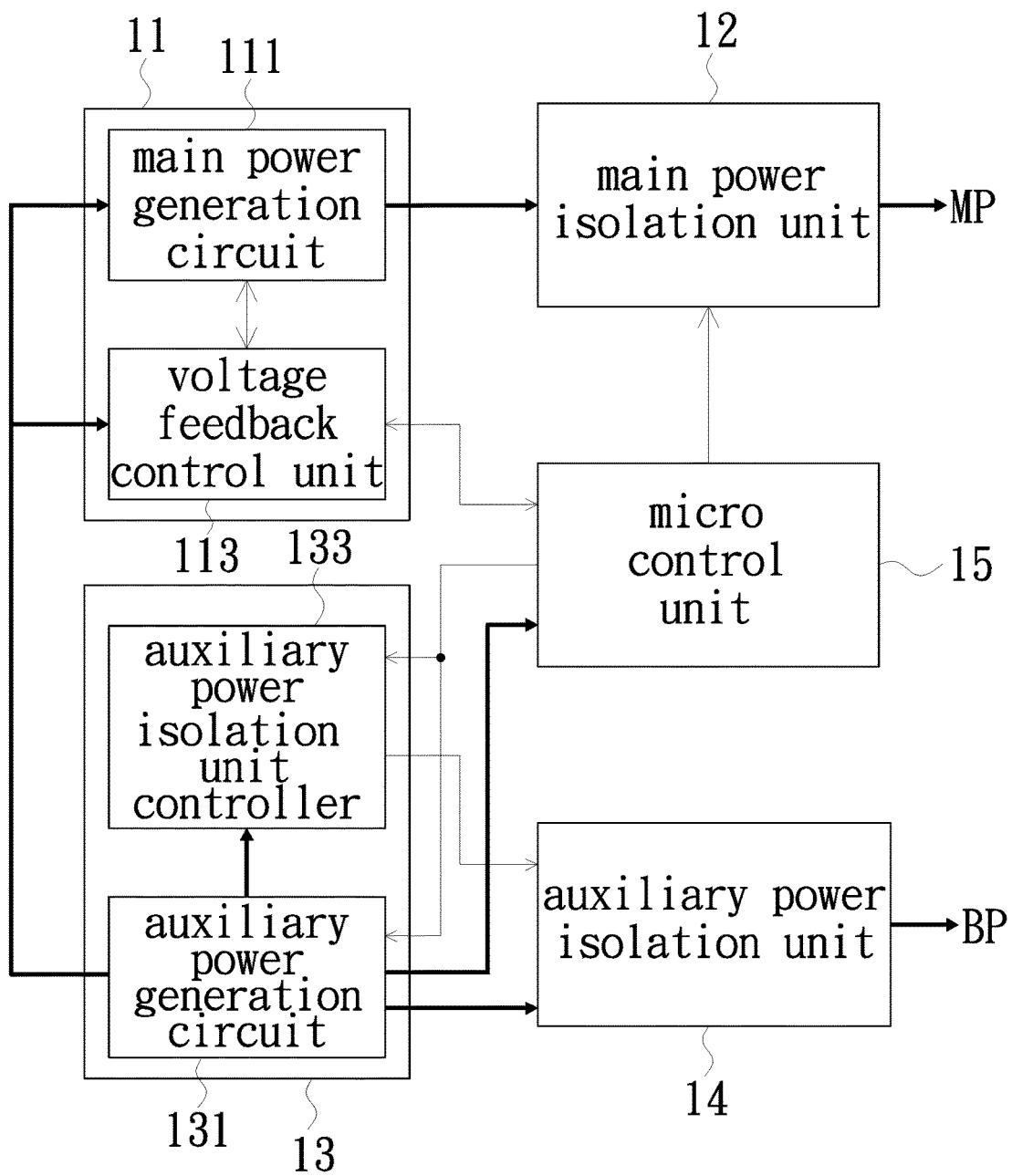
FIG. 2 is a block view of a redundant power in accordance with another embodiment of the present invention.

Please refer to FIG. 2, which is a block view of a redundant power in accordance with an embodiment of the present invention. As shown, the redundant power 100 of the present embodiment includes the main power circuit 11, the main power isolation unit 12, the auxiliary power circuit 13, the auxiliary power isolation unit 14 and the micro control unit 15. The main power circuit 11 includes a main power generation circuit 111 and a voltage feedback control unit 113. The main power generation circuit 111 is configured to generate the main power MP. The voltage feedback control unit 113 is coupled to the micro control unit 15. The voltage feedback control unit 113 is configured to obtain voltage level information of the main power MP, transmit the obtained voltage level information to the micro control unit 15 and receive the cold redundant signal outputted from the micro control unit 15. The auxiliary power circuit 13 includes an auxiliary power generation circuit 131 and an auxiliary power isolation unit controller 133. The auxiliary power generation circuit 131 is configured to generate the auxiliary power BP. The auxiliary power isolation unit controller 133 is coupled to the micro control unit 15. The auxiliary power isolation unit controller 133 is configured to receive the second disable signal outputted from the micro control unit 15 and disable the auxiliary power isolation unit 14 according to the second disable signal. It is to be noted that the main power generation circuit 111, the main power isolation unit 12, the auxiliary power generation circuit 131, the auxiliary power isolation unit 14 and the micro control unit 15 of the present embodiment of FIG. 2 have the same structures and functions as the main power circuit 11, the main power isolation unit 12, the auxiliary power circuit 13, the auxiliary power isolation unit 14 and the micro control unit 15 of the previous embodiment of FIG. 1 respectively; therefore, the details will be omitted herein.

Figure 3:
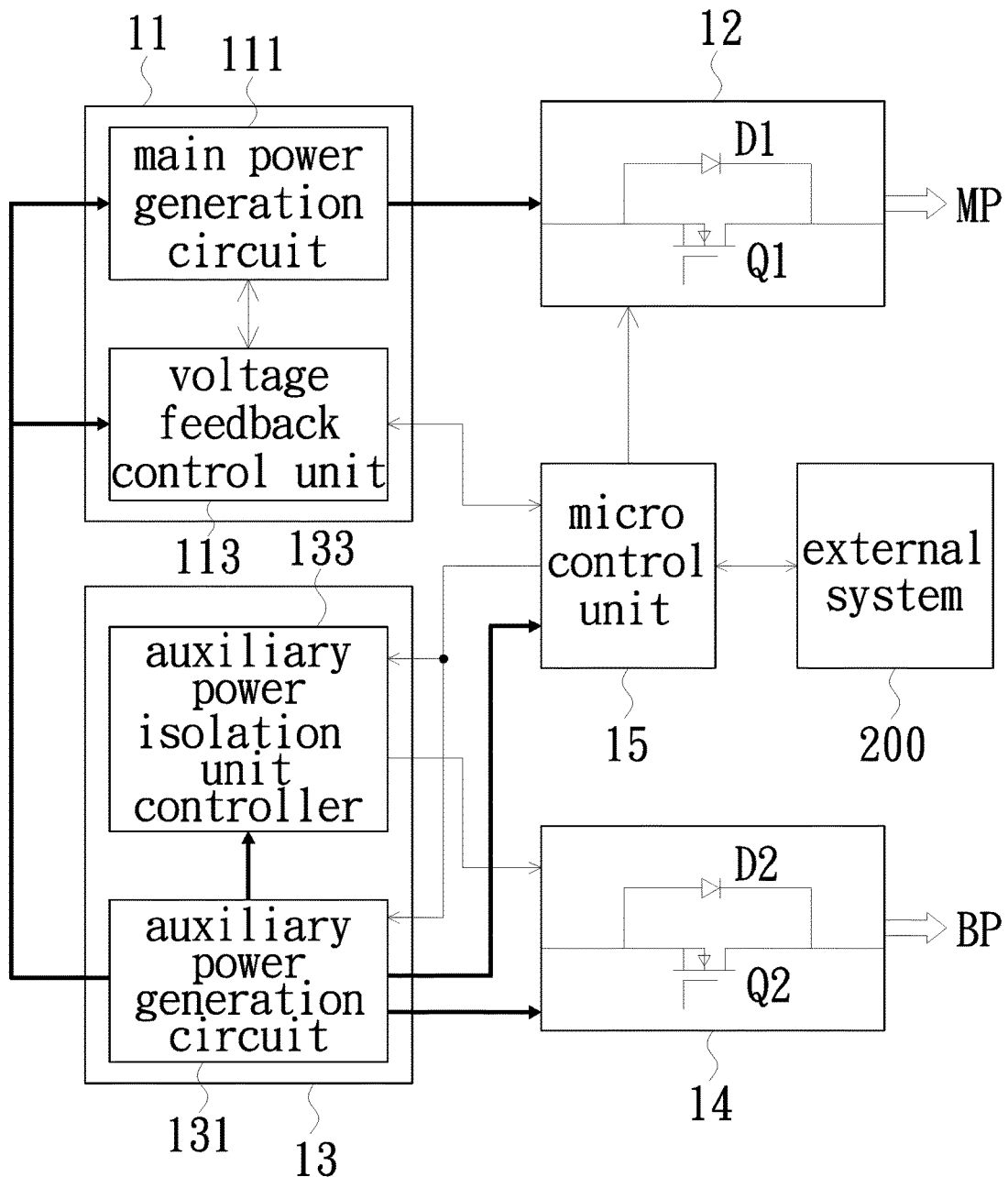
FIG. 3 is a detailed view of the redundant power of FIG. 2 while being in communication with an external system in accordance with an embodiment of the present invention.

FIG. 3 is a detailed view of the redundant power of FIG. 2 while being in communication with an external system in accordance with an embodiment of the present invention. Specifically, in FIG. 2 and FIG. 3, power line is presented by the relatively-thick connecting line and signal line is presented by the relatively-thin connecting line. As shown in FIG. 3, the main power isolation unit 12 includes a first field effect transistor Q1 and a first diode D1. The auxiliary power isolation unit 14 includes a second field effect transistor Q2 and a second diode D2. The source of the first field effect transistor Q1 is connected to an output terminal of the main power circuit 11; the gate of the first field effect transistor Q1 is connected to the micro control unit 15; and the drain of the first field effect transistor Q1 is defined as a first output terminal for outputting the main power MP. The source of the second field effect transistor Q2 is connected to an output terminal of the auxiliary power circuit 13; the gate of the second field effect transistor Q2 is connected to the auxiliary power isolation unit controller 133; and the drain of the second field effect transistor Q2 is defined as a second output terminal for outputting the auxiliary power BP. In addition, the micro control unit 15 is in communication with an external system 200 via an Inter-Integrated Circuit ($I^2C$) bus (not shown).

The following describes four situations that the micro control unit 15 will output the disable signal to cut off the output of the main power circuit 11 or the auxiliary power circuit 13:

(1) the main power circuit 11 and the auxiliary power circuit 13 reduce the respective output voltages thereof and the micro control unit 15 outputs the first disable signal to the main power isolation unit 12 and the second disable signal to the auxiliary power isolation unit 14 when the micro control unit 15 receives the cold redundant signal;

(2) the micro control unit 15 outputs the first disable signal to the main power isolation unit 12 to cut off the output of the main power MP when the output current of the main power is 5 A and the micro control unit 15 detects that no voltage occurs between the gate and the source of the first field effect transistor Q1 in the main power isolation unit 12;

(3) the micro control unit 15 outputs the first disable signal to the main power isolation unit 12 to cut off the main power circuit 11 or outputs the second disable signal to the auxiliary power isolation unit 14 to cut off the auxiliary power circuit 13 for preventing a backflow current when the external voltage is higher than the internal voltage (e.g., the voltage of the external system 200 is higher than the output voltage of the redundant power 100);

(4) the micro control unit 15 outputs the first disable signal to the main power isolation unit 12 to cut off the main power circuit 11 or outputs the second disable signal to the auxiliary power isolation unit 14 to cut off the auxiliary power circuit 13 for preventing a backflow current when the redundant power 100 executes a protection mechanism.

The following, in conjunction with FIG. 3, describes an operation process of the redundant power 100 of the present embodiment.

When an alternating current (AC) power is supplied, the auxiliary power circuit 13 is activated to generate the auxiliary power BP and provide the auxiliary power BP to the main power circuit 11, the micro control unit 15 and the auxiliary power isolation unit 14. The main power circuit 11 is activated to perform a power conversion on the received auxiliary power BP to obtain the main power MP and output the voltage level information and related information thereof to the voltage feedback control unit 113. Then, the voltage feedback control unit 113 transmits the received voltage level information and related information to the micro control unit 15. As described above, the micro control unit 15 is in communication with the external system 200 via an Inter-Integrated Circuit ($I^2C$) bus. When receiving the cold redundant signal outputted from the external system 200, the micro control unit 15 transmits the received cold redundant signal to the voltage feedback control unit 113 and the auxiliary power circuit 13. Then, the voltage feedback control unit 113 reduces the output voltage of the main power circuit 11 according to the cold redundant signal and the micro control unit 15 outputs the first disable signal to the main power isolation unit 12 to cut off the first field effect transistor Q1. Meanwhile, the auxiliary power circuit 13 reduces the output voltage of the auxiliary power BP and the micro control unit 15 outputs the second disable signal to the auxiliary power isolation unit controller 133. The auxiliary power isolation unit controller 133 cuts off the second field effect transistor Q2 according to the second disable signal.

In summary, when the redundant power 100 of the present embodiment is operated in a cold redundant mode, the micro control unit 15 transmits the cold redundant signal outputted from the external system 200 to the main power circuit 11 and the auxiliary power circuit 13. In response to the cold redundant signal, both of the main power circuit 11 and the auxiliary power circuit 13 reduce the respective output voltages and thereby reducing the respective output powers. Compared with the prior art, the redundant power 100 of the present embodiment has reduced power consumption, and the power consumption may decrease to less than 4 W.

Figure 4:
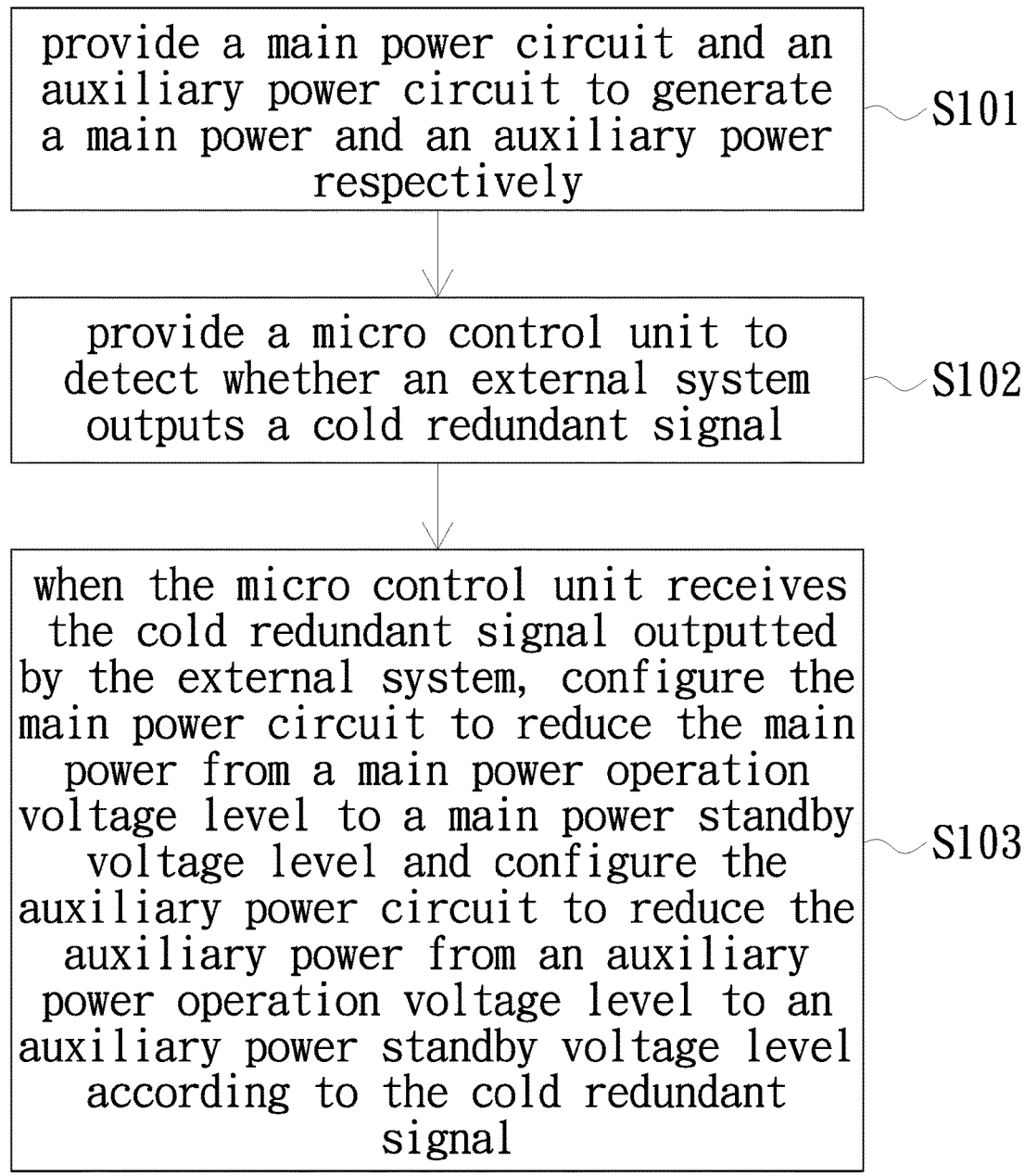
FIG. 4 is a flowchart illustrating a power saving method of a redundant power in a cold redundant mode in accordance with an embodiment of the present invention.

Please refer to FIG. 4, which is a flowchart illustrating a power saving method of a redundant power in a cold redundant mode in accordance with an embodiment of the present invention. As shown, the power saving method of a redundant power in a cold redundant mode of the present embodiment includes steps as follow.

Step S101, providing a main power circuit and an auxiliary power circuit to generate a main power and an auxiliary power respectively. In the present embodiment, the main power has a main power operation voltage level and a main power standby voltage level, and the main power operation voltage level is higher than the main power standby voltage level; the auxiliary power has an auxiliary power operation voltage level and an auxiliary power standby voltage level, and the auxiliary power operation voltage level is higher than the auxiliary power standby voltage level.

Step S102, providing a micro control unit to detect whether an external system outputs a cold redundant signal.

Step S103, when the micro control unit receives the cold redundant signal outputted by the external system, configuring the main power circuit to reduce the main power from the main power operation voltage level to the main power standby voltage level and configuring the auxiliary power circuit to reduce the auxiliary power from the auxiliary power operation voltage level to the auxiliary power standby voltage level according to the cold redundant signal.

In summary, when the power saving method of a redundant power in a cold redundant mode is executed, both of the main power circuit and the auxiliary power circuit reduce the respective output voltages according to the cold redundant signal and thereby reducing the respective output powers. Compared with the prior art, the power saving method of a redundant power in a cold redundant mode of the present embodiment has reduced power consumption, and the power consumption may decrease to less than 4 W.

Figure 5:
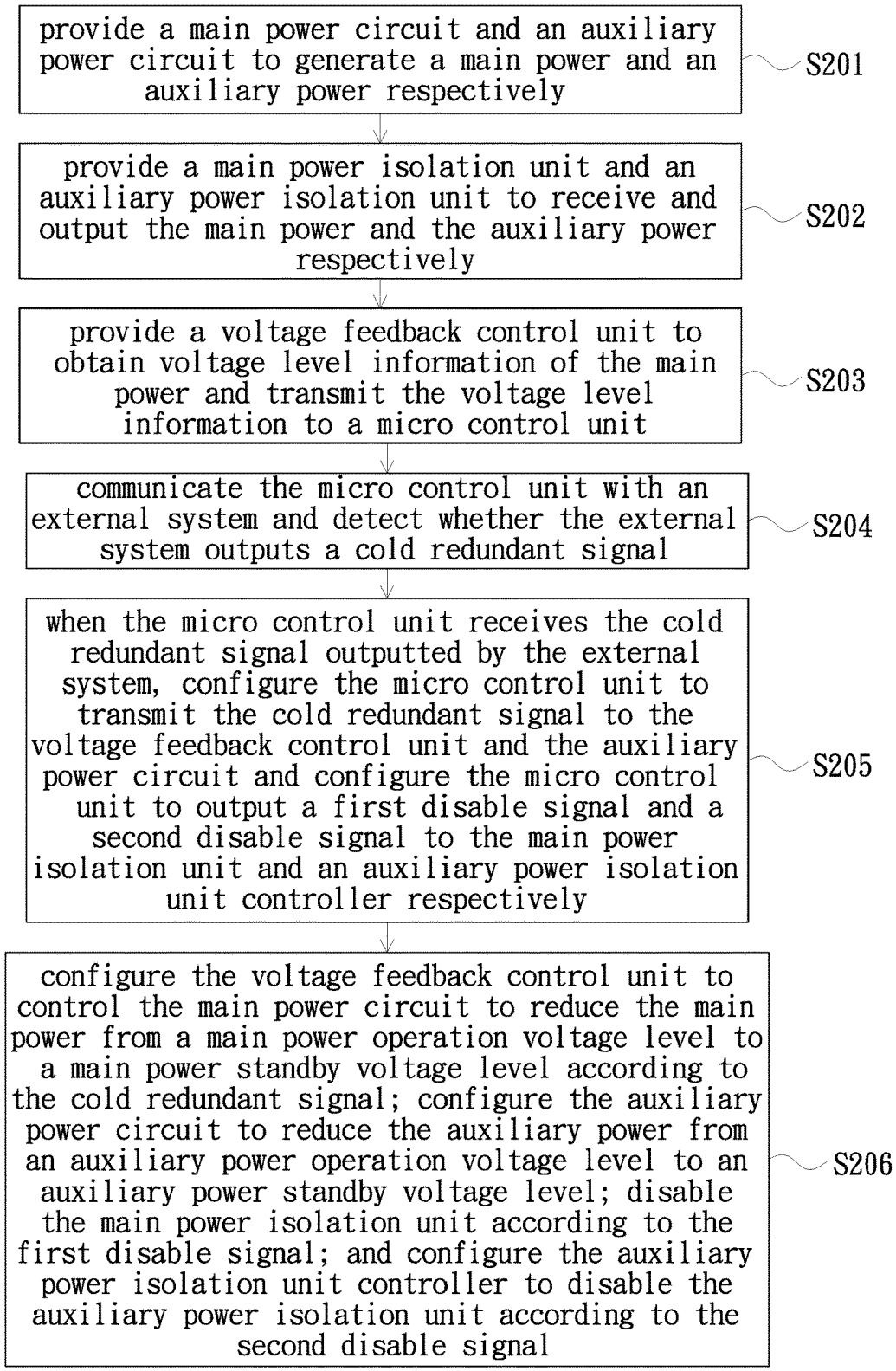
FIG. 5 is a flowchart illustrating a power saving method of a redundant power in a cold redundant mode in accordance with another embodiment of the present invention.

Please refer to FIG. 5, which is a flowchart illustrating a power saving method of a redundant power in a cold redundant mode in accordance with another embodiment of the present invention. As shown, the power saving method of a redundant power in a cold redundant mode of the present embodiment includes steps as follow.

Step S201, providing a main power circuit and an auxiliary power circuit to generate a main power and an auxiliary power respectively. In the present embodiment, the main power has a main power operation voltage level and a main power standby voltage level, and the main power operation voltage level is higher than the main power standby voltage level; the auxiliary power has an auxiliary power operation voltage level and an auxiliary power standby voltage level, and the auxiliary power operation voltage level is higher than the auxiliary power standby voltage level.

Step S202, providing a main power isolation unit and an auxiliary power isolation unit to receive and output the main power and the auxiliary power respectively.

Step S203, providing a voltage feedback control unit to obtain voltage level information of the main power and transmit the voltage level information to a micro control unit.

Step S204, communicating the micro control unit with an external system and detecting whether the external system outputting a cold redundant signal. In the present embodiment, the micro control unit is in communication with the external system via an Inter-Integrated Circuit (I$^2$C) bus.

Step S205, when the micro control unit receives the cold redundant signal outputted by the external system, configuring the micro control unit to transmit the cold redundant signal to the voltage feedback control unit and the auxiliary power circuit and configuring the micro control unit to output a first disable signal and a second disable signal to the main power isolation unit and an auxiliary power isolation unit controller respectively.

Step S206, configuring the voltage feedback control unit to control the main power circuit to reduce the main power from the main power operation voltage level to the main power standby voltage level according to the cold redundant signal; at the same time, configuring the auxiliary power circuit to reduce the auxiliary power from the auxiliary power operation voltage level to the auxiliary power standby voltage level; disabling the main power isolation unit according to the first disable signal; and configuring the auxiliary power isolation unit controller to disable the auxiliary power isolation unit according to the second disable signal.

In the present embodiment, the main power isolation unit includes a first field effect transistor and the auxiliary power isolation unit includes a second field effect transistor. Correspondingly, the step of providing a main power isolation unit includes a step of: providing the first field effect transistor; wherein the source of the first field effect transistor is for receiving the main power, the gate of the first field effect transistor is for receiving the first disable signal, and the drain of the first field effect transistor is for outputting the main power. The step of providing an auxiliary power isolation unit includes a step of: providing the second field effect transistor; wherein the source of the second field effect transistor is for receiving the auxiliary power, the gate of the second field effect transistor is for receiving the second disable signal, and the drain of the second field effect transistor is for outputting the auxiliary power.

In addition, the micro control unit outputs the first disable signal to the main power isolation unit when the output current of the main power is 5 A and no voltage occurs between the gate and the source of the first field effect transistor. When a protection mechanism for the redundant power is activated, the micro control unit outputs the first disable signal to the main power isolation unit or outputs the second disable signal to the auxiliary power isolation unit for preventing a backflow current.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A redundant power, comprising:
a main power circuit configured to generate a main power, wherein the main power has a main power operation voltage level and a main power standby voltage level, and the main power operation voltage level is higher than the main power standby voltage level;
a main power isolation unit coupled to the main power circuit and configured to receive and output the main power;
an auxiliary power circuit configured to generate an auxiliary power, wherein the auxiliary power has an auxiliary power operation voltage level and an auxiliary power standby voltage level, and the auxiliary power operation voltage level is higher than the auxiliary power standby voltage level;

an auxiliary power isolation unit coupled to the auxiliary power circuit and configured to receive and output the auxiliary power; and a micro control unit configured to transmit a cold redundant signal to the main power circuit and the auxiliary power circuit when receiving the cold redundant signal outputted from an external system, and to output a first disable signal and a second disable signal to the main power isolation unit and the auxiliary power isolation unit respectively, wherein the main power circuit reduces the main power from the main power operation voltage level to the main power standby voltage level, and simultaneously the auxiliary power circuit reduces the auxiliary power from the auxiliary power operation voltage level to the auxiliary power standby voltage level, in response to the cold redundant signal, wherein the main power isolation unit is disabled according to the first disable signal, and simultaneously the auxiliary power isolation unit is disabled according to the second disable signal.

2. The redundant power according to claim 1, the main power circuit further comprising a voltage feedback control unit coupled to the micro control unit, wherein the voltage feedback control unit is configured to obtain a voltage level information of the main power, transmit the voltage level information to the micro control unit and receive the cold redundant signal outputted from the micro control unit.

3. The redundant power according to claim 1, the auxiliary power circuit further comprising an auxiliary power isolation unit controller coupled to the micro control unit, wherein the auxiliary power isolation unit controller is configured to receive the second disable signal outputted from the micro control unit and disable the auxiliary power isolation unit according to the second disable signal.

4. The redundant power according to claim 3, the main power isolation unit further comprising a first field effect transistor, and the auxiliary power isolation unit comprising a second field effect transistor, wherein a source of the first field effect transistor is connected to an output terminal of the main power circuit, a gate of the first field effect transistor is connected to the micro control unit, and a drain of the first field effect transistor is defined as a first output terminal, wherein a source of the second field effect transistor is connected to an output terminal of the auxiliary power circuit, a gate of the second field effect transistor is connected to the auxiliary power isolation unit controller, and a drain of the second field effect transistor is defined as a second output terminal.

5. The redundant power according to claim 4, wherein the micro control unit outputs the first disable signal to the main power isolation unit when an output current of the main power is 5 A and no voltage occurs between the gate and the source of the first field effect transistor.

6. The redundant power according to claim 4, wherein when a protection mechanism of the redundant power is activated, and the micro control unit outputs the first disable signal to the main power isolation unit or outputs the second disable signal to the auxiliary power isolation unit for preventing a backflow current.

7. The redundant power according to any one of claims 1-6, wherein the micro control unit is in communication with the external system via an Inter-Integrated Circuit (I²C) bus.

8. A power saving method of a redundant power in a cold redundant mode, the power saving method comprising:

providing a main power circuit and an auxiliary power circuit to generate a main power and an auxiliary power respectively, wherein the main power has a main power operation voltage level and a main power standby voltage level, and the main power operation voltage level is higher than the main power standby voltage level, wherein the auxiliary power has an auxiliary power operation voltage level and an auxiliary power standby voltage level, and the auxiliary power operation voltage level is higher than the auxiliary power standby voltage level;

providing a micro control unit to detect whether an external system outputs a cold redundant signal; and when the micro control unit receives the cold redundant signal outputted by the external system, configuring the main power circuit to reduce the main power from the main power operation voltage level to the main power standby voltage level and simultaneously configuring the auxiliary power circuit to reduce the auxiliary power from the auxiliary power operation voltage level to the auxiliary power standby voltage level in response to the cold redundant signal.

9. The power saving method of the redundant power in the cold redundant mode according to claim 8, further comprising:

providing a main power isolation unit and an auxiliary power isolation unit to receive and output the main power and the auxiliary power respectively, when the micro control unit receives the cold redundant signal outputted by the external system, configuring the micro control unit to output a first disable signal and a second disable signal to the main power isolation unit and the auxiliary power isolation unit respectively, wherein the main power isolation unit is disabled according to the first disable signal and the auxiliary power isolation unit is disabled according to the second disable signal.

10. The power saving method of the redundant power in the cold redundant mode according to claim 8, further comprising:

providing a voltage feedback control unit to obtain voltage level information of the main power, transmit the voltage level information to the micro control unit and receive the cold redundant signal outputted from the micro control unit.

11. The power saving method of the redundant power in the cold redundant mode according to claim 9, further comprising:

providing an auxiliary power isolation unit controller to receive the second disable signal outputted from the micro control unit and disable the auxiliary power isolation unit according to the second disable signal.

12. The power saving method of the redundant power in the cold redundant mode according to claim 11, wherein the step of providing a main power isolation unit comprises:

providing a first field effect transistor, wherein a source of the first field effect transistor is configured for receiving the main power, a gate of the first field effect transistor is configured for receiving the first disable signal, and a drain of the first field effect transistor is configured for outputting the main power, wherein the step of providing an auxiliary power isolation unit comprises:

providing a second field effect transistor, wherein a source of the second field effect transistor is configured for receiving the auxiliary power, a gate of the second field effect transistor is configured for receiving the second disable signal, and a drain of the second field effect transistor is configured for outputting the auxiliary power.

13. The power saving method of the redundant power in the cold redundant mode according to claim 12, wherein the micro control unit outputs the first disable signal to the main power isolation unit when an output current of the main power is 5 A and no voltage occurs between the gate and the source of the first field effect transistor.

14. The power saving method of the redundant power in the cold redundant mode according to claim 12, further comprising:
   when a protection mechanism of the redundant power is activated, configuring the micro control unit to output the first disable signal to the main power isolation unit or output the second disable signal to the auxiliary power isolation unit for preventing a backflow current.

15. The power saving method of the redundant power in the cold redundant mode according to any one of claims 8-14, wherein the micro control unit is in communication with the external system via an Inter-Integrated Circuit ($I^2C$) bus.

* * * * *